United States Patent [19]

Conte, Jr. et al.

[11] Patent Number: 5,092,964

[45] Date of Patent: Mar. 3, 1992

[54] PRODUCTION OF LOW CHOLESTEROL BUTTER OIL BY VAPOR SPARGING

[75] Inventors: Joseph A. Conte, Jr., Waterford; Bobby R. Johnson, Cherry Hill, both of N.J.

[73] Assignee: Campbell Soup Company, Camden, N.J.

[21] Appl. No.: 305,712

[22] Filed: Feb. 3, 1989

[51] Int. Cl.$^5$ .................... B01D 3/38; A23D 15/14; C11B 3/14

[52] U.S. Cl. ........................ 203/29; 203/49; 203/73; 203/79; 203/80; 203/92; 260/428; 426/417; 426/476; 426/491; 426/492; 426/522; 426/581; 426/601; 552/545

[58] Field of Search ............... 203/92, 93, 28, 29, 203/49, 95–97, 90, 73, 79, 80; 260/428, 397.25; 426/492, 491, 417, 581, 601, 488, 522, 476, 475; 552/545

[56] References Cited

U.S. PATENT DOCUMENTS

| | | |
|---|---|---|
| 1,805,751 | 5/1931 | Auerbach . |
| 2,073,327 | 3/1937 | Vigers .................... 202/205 |
| 2,146,894 | 2/1939 | Hickman .................... 203/60 |
| 2,165,378 | 7/1939 | Hickman .................... 203/60 |
| 2,247,496 | 7/1941 | Hixson . |
| 2,351,832 | 6/1944 | Neal . |
| 2,407,616 | 9/1946 | Phelps . |
| 2,467,906 | 4/1949 | Passino . |
| 2,613,215 | 10/1952 | Mattil . |
| 2,621,197 | 12/1952 | Thurman .................... 260/428 |
| 2,674,609 | 4/1954 | Beal et al. .................... 260/428 |
| 2,759,883 | 8/1956 | Thurman . |
| 3,450,541 | 6/1969 | Schwartz et al. . |
| 3,519,435 | 7/1970 | MacCollom . |
| 3,563,765 | 2/1971 | Melnick . |
| 3,693,322 | 9/1972 | Lineberry . |
| 3,717,474 | 2/1973 | Fioriti . |
| 3,881,034 | 4/1975 | Levin . |
| 3,939,281 | 2/1976 | Schwengers . |
| 4,002,772 | 1/1977 | Haas .................... 426/281 |
| 4,005,228 | 1/1977 | Norris . |
| 4,104,286 | 8/1978 | Fallis . |
| 4,234,619 | 11/1980 | Yano . |
| 4,280,961 | 7/1981 | Schneider . |
| 4,333,959 | 6/1982 | Bracco . |
| 4,394,221 | 7/1983 | Stage et al. .................... 203/92 |
| 4,400,398 | 8/1983 | Coenen . |
| 4,504,503 | 3/1985 | Biernoth . |
| 4,613,410 | 9/1986 | Rivers .................... 203/90 |
| 4,789,554 | 12/1988 | Scavone et al. .................... 426/601 |
| 4,804,555 | 2/1989 | Marschner . |
| 4,838,997 | 6/1989 | Merk .................... 202/205 |

FOREIGN PATENT DOCUMENTS

| | | |
|---|---|---|
| 0174848 | 3/1986 | European Pat. Off. . |
| 1525315 | 9/1978 | United Kingdom . |
| 1559064 | 1/1980 | United Kingdom . |
| 2190095 | 11/1987 | United Kingdom .................... 260/428 |

OTHER PUBLICATIONS

Dudrow, "Deodorization of Edible Oil," J. Am. Oil Chemists' Soc. 60: 224–226 (1963).

"Deodorization," Bailey's Industrial Oil and Fat Products, Chapter 18.

Zehnder, "Deodorization, Principles and Practices," J. Am. Oil Chemists' Soc. 44:478 A et. seq. (1967).

Riisom, "High Performance Liquid Chromatography Analyses of Emulsifiers: I. Quantitative Determinations of Mono- and Diacylglycerols of Saturated Fatty Acids," J. Am. Oil Chemists' Soc. 50:650–652 (1978).

"Methods and Procedures," Bailey's Industrial Oil and Fat Products, 510–513, 4th Ed.

Jurriens, "Analysis of Glycerides: II. Analysis and Characterization of Oils, Fats and Fat Products," pp. 222 et seq. (1968).

Keenan, "Biochemical and Morphological Comparison of Plasma Membrane and Milk Fat Globule Membrane From Bovine Mammary Gland," J. Cell Biol. 44: 80–93 (1970).

Parsons, "Two-Dimensional Thin-Layer Chromatography of Polar Lipids From Milk and Mammary Tissue," J. Lipid Res. 8:696–698 (1967).

Fillerup, "Chromatographic Separation of the Plasma Lipids," Proc. Soc. Exptl. Biol. Med., 83:574–577 (1953).

Dapper, "Use of Polar Aprotic Solvents to Release Membranes from Milk Lipid Globules," J. Dairy Sci. 70:760–765 (1987).

"Physical Equilibria in Milk: The Lipid Phase," Fundamentals of Dairy Chemistry, pp. 414, 440–447, 475–477.

Shishikura, "Modification of Butter Oil by Extraction with Supercritical Carbon Dioxide," Agric. Biol. Chem. 50:1209–1215 (1986).

Arul, "Distribution of Cholesterol in Milk Fat Fractions," J. Dairy Res. 55:361–371 (1988).

Arul, "Fractionation of Anhydrous Milk Fat by Short-Path Distillation," J. Am. Oil Chemists' Soc. 65:1642–1646 (1988).

Primary Examiner—Wilbur Bascomb, Jr.
Attorney, Agent, or Firm—Banner, Birch, McKie & Beckett

[57] ABSTRACT

Butter oil is heated under high vacuum and sparged for up to about 6 hours to remove cholesterol. Walls surrounding a vapor space above the sparged mass preferably are heated to remove cholesterol with reduced loss of desirable low molecular weight components. Alternatively, the temperature of the butter oil is lowered, and the butter oil is sparged with steam for an additional period of up to about 3 hours to partially hydrolyze triglycerides to mono- and di-glycerides and free fatty acids. The low cholesterol butter oil then is cooled before being exposed to air, thus avoiding oxidation which produces off-flavors. The resulting low-cholesterol butter fat and products made therefrom have composition and organoleptic characteristics substantially similar to those of natural butter oil and butter.

7 Claims, No Drawings

PRODUCTION OF LOW CHOLESTEROL BUTTER OIL BY VAPOR SPARGING

BACKGROUND OF THE INVENTION

1. Field of the Invention

This invention relates to a method of producing low-cholesterol butter fat by vapor sparging, and to the low-cholesterol butter fat product produced by the method.

2. Description of Related Art

Milk fat-containing foods are popular with consumers. Consumers prize the distinctive organoleptic properties of milk fat. For example, butter, which contains 80 percent milk fat, is highly prized for its properties as a condiment. However, milk fat and all other animal fats contain the sterol cholesterol. Recently, excessive dietary fat and cholesterol consumption have been strongly linked to human health issues, particularly coronary heart disease. Some consumers have therefore become hesitant about utilizing cholesterol-containing products.

Others have recognized the desirability of reducing the cholesterol content of animal fats, including milk fat. However, most processes for cholesterol reduction produce products having organoleptic properties which typically differ significantly from the properties of the natural product. For example, mouth feel, melting point, or color may be significantly altered by the cholesterol removal technique. A satisfactory cholesterol removal process must maximize the removal of cholesterol and minimize alterations to the properties of the cholesterol-containing product to yield a low-cholesterol product indistinguishable from fresh, natural product.

Methods for deodorizing and stabilizing oils are also known. Some of these methods remove sterols from oil, as noted in U.S. Pat. No. 2,613,215. This patent discloses a method which removes "unsaponifiable materials," together with free fatty acids, from oil. After partial hydrogenation, the unsaponifiable materials are removed by high temperature fractionation with a liquified, normally-gaseous hydrocarbon solvent. This patent also discloses that polar solvents can be utilized to separate unsaponifiable materials, which are soluble in the solvent, from the major portion of the oil, which is substantially immiscible in polar solvent. The thus-treated oil is further "deodorized," essentially as taught in U.S. Pat. No. 2,351,832, i.e., by injecting steam at a temperature above 250° C. through the oil at a pressure of less than about 20 millimeters of mercury. Deodorization, as taught in this patent, is unsatisfactory for removing cholesterol from animal fat not only because cholesterol removal is low but also because losses of lower molecular weight glycerides (mono-, di-, and tri-glycerides) are significant. Loss of these lighter glycerides adversely affects the organoleptic characteristics of butterfat, giving the product a waxy mouth feel.

Fractionation of fats has been used to obtain separate component portions, typically so that the portions can be selectively recombined to yield a product having pre-selected characteristics. For example, the solvent-assisted fractionation disclosed in U.S. Pat. No. 4,005,228 is utilized to separate butter fat into fractions by melting point, i.e., melting point less than 0° C., between 0° and 20° C., and above 20° C. The high- and low-melting fractions are combined to yield a dairy spread.

Supercritical extraction has also been utilized to modify various foodstuffs, including butter, as described in U.S. Pat. No. 4,504,503. However, one of the drawbacks to this technique is that conditions which maintain the solvent in the supercritical region typically involve extremes of temperature and pressure. Therefore, the equipment required is expensive. For example, in this patent, the preferred temperature range is from 40° to 250° C., while the preferred pressure range is from 100 to 400 bar.

British patent specification 1,559,064, an improvement of GB 1,525,315, discloses the use of molecular distillation to reduce the cholesterol content of a medium containing fats. After degassing, anhydrous fat is subjected to molecular distillation at a pressure less than 0.005 Torr to remove the unsaponifiable fraction, which contains the sterols. Then, in accordance with the method of GB 1,525,315, an aqueous medium having a viscosity of from 2000 to 20,000 cp measured at a temperature between 20° and 30° C. is mixed into the treated fat at a temperature between 15° and 45° C. to produce a butter-like product.

Both U.S. Pat. No. 2,613,215 and EP 0 174 848 A2 teach that cholesterol can be removed from fats by contacting the fat with a solid absorbent or adsorbent material. Silica gel and activated carbon are utilized as examples of appropriate material.

Shishikura, "Modifications of Butter Oil by Extraction with Supercritical Carbon Dioxide", 50 Agric. Biol. Chem. 1209 (1986), notes that supercritical fluid extraction using carbon dioxide is useful for fractionation of triglycerides in butter oil according to carbon number, but that this technique does not separate cholesterol from the triglycerides. Instead, butter oil was contacted with supercritical carbon dioxide and silica gel. However, this technique not only lowered the cholesterol level, but also affected the triglyceride distribution. Thus, the technique is unsatisfactory, because the composition and spreadability are affected.

The above-described methods for cholesterol removal are unsatisfactory. Known steam deodorization techniques are feasible for deodorization because of the great differences between the volatility of triglycerides and the volatility of substances which give oils their distinctive flavors and odors. However, for removal of cholesterol from butter fat, one must look at the volatility difference between cholesterol and the substances which give butter its distinctive organoleptic characteristics. The volatility difference between the mono- and di-glycerides and lower molecular-weight triglycerides and cholesterol is relatively small. Both the presence of some mono-and di-glycerides in butter fat and the unique triglyceride composition make important contributions to the mouth feel of butter. Alteration of the concentration of these components in butter fat and the relative proportions thereof yields unacceptable mouth feel.

Modifications to the steam-sparging processes also fail as cholesterol removal techniques. For example, U.S. Pat. No. 2,407,616 teaches that heating the vapor from a steam sparging deodorization process prevents condensation and reflux of vaporized impurities. With respect to mono- and di-glycerides from butter fat, this would merely ensure that these components are removed from the treated butter fat. Another method which virtually assures that all the volatiles are removed is taught in U.S. Pat. No. 2,759,883. This patent discloses that creation of a thin film of oil both when the oil is first exposed to vacuum and after heating enhances the removal of volatile components.

It is an object of this invention to provide a method for producing a low-cholesterol butter fat product by sparging.

It is another object of this invention to provide a method for producing a low-cholesterol butter fat product by multi-stage sparging wherein at least the last stage utilizes steam as the sparge medium at process conditions which promote partial hydrolysis of triglycerides to free fatty acids and mono- and di-glycerides to substantially restore the composition of the low-cholesterol product to that of natural butter fat.

It is a further object to this invention to provide a method for producing a low-cholesterol butter fat product by sparging, under vacuum, while applying heat to the walls of a vapor space above the mass during sparging.

It is another object of this invention to provide products produced by these methods.

SUMMARY OF THE INVENTION

In accordance with these and other objects, butter oil is heated under high vacuum and sparged for up to about six hours with sparge medium selected from the group consisting of steam and gas and vapor chemically inert with butter oil to remove cholesterol. Walls surrounding a vapor space above the sparged mass are heated to enhance cholesterol removal while minimizing monoglyceride, diglyceride, and low molecular weight triglyceride loss. Alternatively, after a high vacuum sparging, the temperature of the butter oil is lowered and the butter oil is sparged with steam for an additional period of up to about 3 hours to partially hydrolyze triglycerides to mono- and di-glycerides and free fatty acids. The cholesterol-reduced butter oil then is cooled before being exposed to air, thereby minimizing oxidation and undesirable flavor changes. The resulting low-cholesterol butter fat products made with this reduced-cholesterol butter oil have composition and organoleptic characteristics substantially similar to those of natural butter oil.

DETAILED DESCRIPTION OF THE INVENTION

This invention is based on the discovery that composition and organoleptic characteristics of natural butter fat can be restored in butter oil vapor sparged under severe conditions by treating the sparged butter oil so that triglycerides are hydrolyzed to free fatty acids and mono- and di-glycerides. This hydrolysis restores the relative concentration of the glyceride and fatty acid components similar to those of natural butter. The inventors have also discovered that less-severe sparging conditions, when combined with heating the walls of the vessel containing the vapor space over the sparged butter oil mass to heat the thin film which condenses thereon, effectively removes cholesterol while maintaining composition and organoleptic characteristics similar to those of natural butter oil, thus obviating a post-sparging hydrolysis step.

In the method of this invention, butter oil is heated under high vacuum. The heated oil is sparged under this vacuum, typically for a period sufficient to remove a major portion of the cholesterol. In a preferred embodiment, sparging is combined with heating walls enclosing a vapor space over the sparged mass of butter oil. Alternatively, more severe sparging conditions are utilized without heating the walls. Thereafter, the temperature of the mass is reduced and the butter oil is sparged with steam at conditions sufficient to partially hydrolyze the triglycerides and form free fatty acids and mono- and di-glycerides. This sparge/hydrolyze embodiment removes cholesterol and substantially restores the composition and organoleptic characteristics of natural butter. The butter oil is cooled before exposing it to air to minimize oxidation and undesirable flavor changes.

In the practice of this invention, typically, at least 50 percent of the cholesterol is removed. It is preferred to remove at least about 60 percent, more preferably at least about 70 percent, of the cholesterol originally present. However, any removal level can be selected by those who practice the invention. Cholesterol reduction in excess of 89 percent with 90 percent fat recovery has been achieved by the practice of this invention.

Butter oil may be obtained by any known method. As those skilled in the art recognize, butter oil is that fraction of butter remaining after removal of the aqueous fraction, which contains, inter alia, proteins and sugars, is removed. Components such as proteins and sugars cook and coagulate under conditions utilized in the practice of the invention, and therefore must be substantially completely removed. Thus, butter oil is utilized in the practice of the invention.

Although butter oil may suitably be treated in accordance with the method of the invention, anhydrous butter oil is preferred. Removal of water from the butter oil before the oil is treated under high vacuum is preferred to reduce the quantity of material which must be removed under high vacuum. Any method of dehydration known to skilled practitioners, such as centrifugation of butter at a temperature of about 70° C. (158° F.) or low-vacuum treatment, may be utilized. The anhydrous butter oil typically will contain less than about 1 percent, preferably less than about 0.5 percent, and more preferably less than about 0.1 percent by weight aqueous components.

In accordance with the method of the invention, butter oil is heated to a temperature between about 200° and 265° C. by any familiar technique. However, care should be taken to ensure that heating is even and that localized hot spots are not formed. The precise rate at which this heating occurs does not affect the cholesterol removal process. Even temperature throughout the butter oil during heating can be obtained by gently agitating the butter oil while ensuring that no air is entrained within the hot butter oil. Excessive exposure to air causes oxidation, producing rancid odor and flavor in product.

Because the rate of oxidation increases as temperature is increased, a vacuum should be established before the temperature has reached about 70° C. Methods of establishing high vacuum, e.g., a vacuum of less than about 5 Torr, preferably less than about 1 Torr, and more preferably between about 0.1-0.5 Torr, are known to those skilled in the art. When the pressure has been reduced to 5 Torr, the temperature may be increased simultaneously with further pressure reduction, if desired.

High vacuum is maintained during practice of the method of this invention. Insufficient vacuum during sparging reduces the separation rate. At constant sparge medium pressure, flow of sparge medium into a vessel is directly proportional to the pressure in the vessel. Thus, excessive pressure in the vessel reduces sparge medium flowrate.

Skilled practitioners recognize that it is preferred to minimize the quantity of material removed through the equipment which is used to maintain high vacuum. Not only is operating cost reduced, but also contamination of the equipment is avoided. Thus, it is preferred that the sparge medium and the material removed from the butter oil be condensed before it enters this vacuum-producing equipment. Typically, the sparge medium, together with the material removed from the butter oil, is collected as a liquid in cold traps or condensers. Therefore, although steam or any vapor or gas which is inert to butter oil, such as nitrogen or carbon dioxide, may be used as the sparge medium, it is preferable to use a medium which is easily condensed, such as water vapor (steam). Material thus recovered, called condensate, can be recycled, discarded, or otherwise disposed of in any manner desired by the operator. Of course, steam must be used during the sparging wherein triglycerides are hydrolyzed.

Temperatures less than about 200° C. are too low to afford adequate cholesterol removal. Temperatures greater than about 265° C. produce various deleterious effects, including reduced yield. Further, the butter product made from the low cholesterol butter fat will have a waxy mouth feel, due to removal of too many low molecular weight glycerides.

Preferred temperature ranges differ between embodiments, as the sparge/hydrolyze embodiment (utilizing a subsequent hydrolysis step) preferably uses a more severe first sparge than does the preferred embodiment. The temperature for the sparge/hydrolyze embodiment preferably ranges between about 210°-255° C., more preferably between about 220°-250° C., most preferably between about 225°-250° C. The temperature range for the preferred, less-severe sparging with heating of the walls of the vapor space, preferably is between about 200°-240° C., more preferably between about 200°-230° C., most preferably between about 200°-220° C.

At severe conditions for sparging utilized in the sparge/hydrolyze embodiment, butter oil is sparged for up to about 6 hours, preferably up to about 4 hours, more preferably between about 1.0–2.5 hours, and most preferably between about 1.5 and 2.5 hours. During this period, the amount of sparge medium used is between about 20 and 100 weight percent, preferably between about 30 and 80 weight percent, and more preferably between about 40 and 60 weight percent, of the weight of the butter oil present. Boiling chips or similar devices can be utilized in the fluid butter oil to aid the dispersion of sparge medium therein.

Those skilled in the art recognize that the quantity of sparge medium is significantly greater than that utilized to deodorize oils and that the pressure is significantly lower. However, the use of an excess of sparge medium may result in excessive fat loss and inability to control product quality. Insufficient flow of sparge medium does not remove sufficient quantities of cholesterol from the butter fat. Colorimetric analysis, gas chomatography, or any suitable technique is used to determine when sparging should cease because the preselected quantity of cholesterol has been removed from the butter oil.

When the desired cholesterol concentration in the butter oil has been reached, sparging is ceased and the temperature is reduced to between about 160° and 210° C., preferably between about 170° and 195° C., and more preferably between about 180° and 190° C. Then, steam is sparged through the butter oil for up to about 3 hours, preferably up to about 2 hours, more preferably about 0.25 and 1.5 hours, and most preferably between about 0.5 and 1.5 hours, to cause at least partial hydrolysis of triglycerides to free fatty acids and mono- and di-glycerides which replace those which are removed by the severe sparging step. During this hydrolysis step, steam is introduced at a rate which would satisfy the sparging requirement for the first step. Preferably, steam is used for both sparging and hydrolysis periods and is introduced at a constant rate during both periods.

Preferably, less severe sparging is used and the walls surrounding the vapor space above the sparged butter oil mass are heated. The temperature of the walls preferably is greater than the temperature of the butter oil mass during the sparging, but below 265° C., as described above. The preferred embodiment reduces the time required and the mass of sparge medium utilized over the sparge/hydrolyze embodiment. Further, the yield of low-cholesterol product is higher.

If steam is utilized as the sparge medium, the mass of steam is between about 10 and 70 weight percent, preferably between about 20 and 60 weight percent, more preferably between about 30 and 50 weight percent based on the mass of butter oil treated. The length of the sparging period typically does not exceed about 4 hours, and preferably is less than about 3 hours, more preferably is between about 0.2 and 2 hours, and most preferably between about 0.25 and 1 hour.

In this embodiment, the walls containing the vapor space above the sparged oil mass are heated throughout the sparging period. The inventors have discovered that heating the film of butter oil which condenses on these walls by heating the walls increases cholesterol reduction and reduces loss of butter fat. Although the inventors do not wish to be bound by this theory, it is believed that this heating produces a thin film molecular distillation effect. This effect helps ensure that the cholesterol is carried out with the sparge medium while the desired fractions of butter oil are returned to the butter oil mass.

This embodiment also affords better fat yields than the sparge/hydrolyze embodiment. The less severe sparging conditions distill less of the desirable components and allow those components which have been vaporized to condense on the walls surrounding the vapor phase and be returned to the butter oil, rather than be carried out with the exhaust sparge medium. Therefore, hydrolysis of triglycerides is not necessary.

The walls of the sparging vessel which contain the vapor space are heated to a temperature above that of the butter oil being sparged, but below about 265° C. Temperatures which exceed about 265° C. tend to abuse the butter oil, i.e., such temperatures cause loss of desirable components. At temperatures above about 265° C., desirable components which were vaporized tend to remain vaporized, and thus are lost. At temperatures below about 265° C., the vaporized components which are to be retained in the treated butter fat condense on the wall, and thus are retained in the product. Preferably, the wall temperatures is less than about 255° C., and more preferably is less than about 245° C.

Treated butter oil then is cooled to less than about 70° C., preferably to less than about 50° C., before exposing the butter oil to air. This step helps to avoid oxidation of the butter oil and the rancid flavor which is developed by oxidation. The length of the cooling period can be selected by the practitioner.

Reduced cholesterol butter oil then is recovered by any suitable technique. Typically, the treated butter oil is decanted while still fluid, i.e., at elevated temperature. The butter oil then is placed in containers and the temperature lowered to cause the butter oil to solidify. Alternatively, fluid low-cholesterol butter oil may be transferred to another apparatus for further processing.

Adjuvants may be added after the deodorization, if desired. Adjuvants are incorporated in manners known to those skilled in the art. Typical additives include anti-oxidants such as TBHQ and BHA, stabilizing agents such as citric acid, and vitamins. Various colorants also may be utilized to restore natural color to the low cholesterol butter fat.

Low-cholesterol butter product is made by intimately admixing low-cholesterol butter oil with suitable aqueous fluid and producing an oil-in-water emulsion which has butter-like properties. Any aqueous fluid which is organoleptically acceptable may be utilized. Suitable fluids include water, the liquid removed when butter oil is dehydrated, whey, and skim milk and its equivalents. Such equivalents may be prepared by, for example, preparing a solution of dried whey, of casein, or of a combination thereof, in appropriate concentration. Appropriate adjuvants also may be utilized.

The following examples illustrate various aspects of this invention, but are in no way intended to limit the scope of the invention. The scope of the invention is limited only by the appended claims.

EXAMPLE 1

Eight hundred grams of filtered butter oil having 265 milligrams of cholesterol per 100 grams oil was placed in a two liter distillation vessel equipped with a sparging device. Throughout sparging, the pressure ranged between 0.1 and 0.5 Torr. The butter oil was heated to 233° C. and sparged with steam at a rate sufficient to supply about 500 grams, i.e., about 63 weight percent, of the butter oil in 1.5 hours. The temperature then was reduced to between 180° and 190° C. and steam sparged for an additional hour to hydrolyze triglycerides. The butter oil was cooled to less than about 50° C., at which time 0.01 weight percent TBHQ (an antioxidant) and 0.05 weight percent citric acid (a stabilizer) were added to the butter oil.

Seven hundred twenty grams of butter oil containing 29 milligrams of cholesterol per 100 gm of oil were recovered. Thus, with about 90 percent butter oil recovery, cholesterol reduction of 89 percent was achieved.

A low-cholesterol butter product was prepared with this low-cholesterol butter oil. An aqueous composition was made by blending equal parts of water and the aqueous fraction containing milk proteins and sugars recovered from the preparation of butter oil from butter. Seven parts of this aqueous composition, to which butter flavor and salt were added, were homogenized with 3 parts of low-cholesterol butter oil at 57°-68° C. The resulting low-cholesterol butter product resembles heavy cream at temperatures in this range. The product was cooled to about 20° C. and churned into a butter-like product by agitation. This butter-like product had organoleptic properties, especially mouth feel and melt characteristics, comparable to those of untreated butter.

COMPARATIVE EXAMPLE 1

This example illustrates the effect of sparging temperature, when only sparging is used, on cholesterol removal from butter oil. The other operating conditions were relatively constant. The pressure was between about 0.3 and 0.5 Torr.

TABLE 1

| Run | T, °C. | Sparge Period (hrs.) | Wt percent Steam Utilized | Percent Cholesterol Reduction | Fat Quality |
|---|---|---|---|---|---|
| A | 200 | 5.5 | 70 | 50 | |
| B | 230 | 6 | 80 | 85 | Bleached; Mouth feel marginally acceptable |
| C | 265 | 5 | 70 | 90 | Bleached; unacceptable (waxy) mouth feel. |

These runs make it clear that steam sparging alone produces products which have minimal cholesterol reduction or unacceptable organoleptic properties. At best, product having marginally acceptable organoleptic properties such as mouth feel is produced.

EXAMPLE 2

Butter oil was treated in accordance with the preferred embodiment of this invention wherein the thin film which condenses on the wall of vapor space above the mass being sparged was heated. The butter oil was sparged with a quantity of steam equal to 50 weight percent of the weight of the butter oil at 200° C. for 2.5 hours. The pressure was between 0.3 and 0.5 Torr. The temperature of the wall was 245° C. At these conditions, 93 percent of the cholesterol was removed.

Organoleptically acceptable low cholesterol butter product is prepared as described an Example 1.

Although preferred embodiments of this invention have been discussed herein, those skilled in the art will appreciate that changes and modifications may be made without departing from the spirit of the invention, as defined in and limited only by the scope of the appended claims.

We claim:

1. A process for the preparation of low-cholesterol butter oil which comprises the steps of:
   a. heating a mass of butter oil having a surface under high vacuum at a temperature of from about 200° to about 265° C. for a period of up to about 6 hours while sparging the butter oil with sparge medium introduced into the butter oil below the surface, said sparge medium selected from the group consisting of steam, gas chemically inert with butter oil, vapor chemically inert with butter oil, and blends thereof, to remove cholesterol from the butter oil;
   b. reducing the temperature of the butter oil from step (a) to between about 160°-210° C.;
   c. maintaining this reduced temperature and sparging with steam for a time sufficient to hydrolyze triglycerides and produce fatty acids and mono- and di-glycerides;
   d. cooling the heated butter oil to a temperature below about 70° C.; and e. separately recovering low cholesterol butter oil having composition and organoleptic characteristics similar to those of natural butter oil.

2. The process of claim 1 wherein the temperature of step (a) is between about 220° and 250° C.

3. The process of claim 2 wherein the temperature of step (b) is between about 170° and 195° C.

4. The process of claim 2 wherein the pressure is less than about 1 Torr.

5. The process of claim 4 wherein the pressure is between about 0.1 and 0.5 Torr.

6. The process of claim 4 wherein the sparge medium is steam and the quantity of steam utilized is between about 20 and 100 weight percent based on the weight of the butter oil.

7. The process of claim 6 wherein the quantity of steam is between about 30 and 80 weight percent based on the weight of the butter oil.

* * * * *